F. WHEATLEY.
HOSE NOZZLE.
APPLICATION FILED FEB. 7, 1910.
992,314.
Patented May 16, 1911.
Fig. 1.
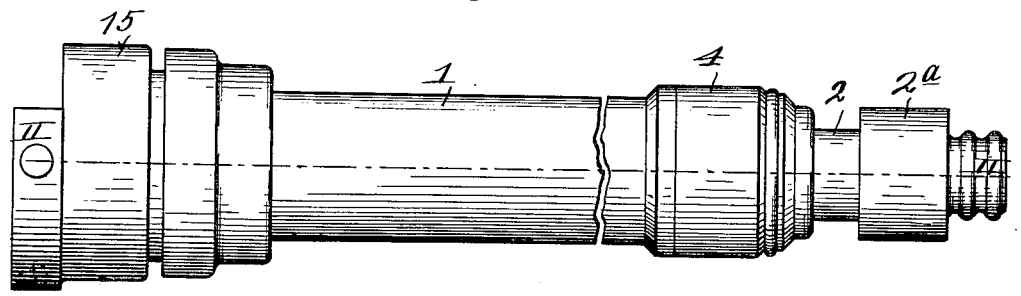
Fig. 2.
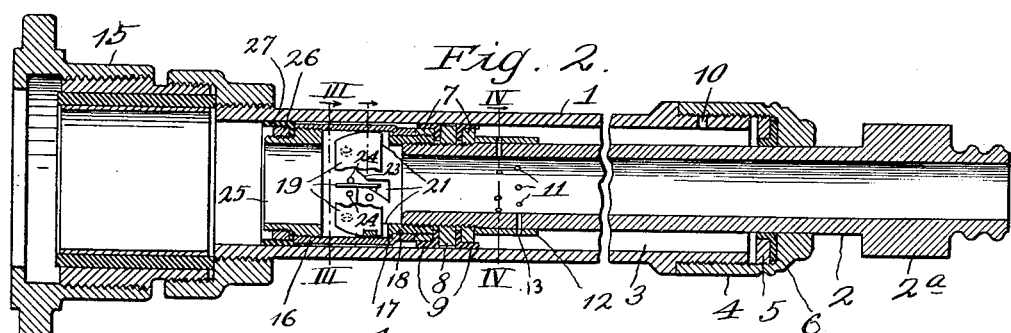
Fig. 3.
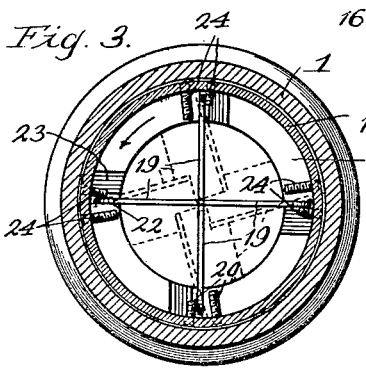
Fig. 5.
Fig. 4.
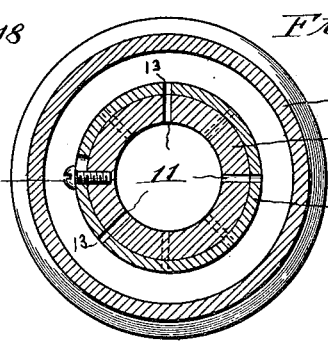
Fig. 6.
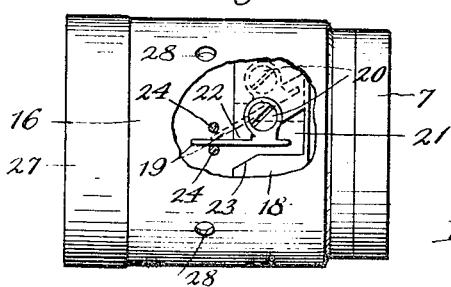
Witnesses:
Inventor,
Francis Wheatley,
By F. G. Fischer, atty.

UNITED STATES PATENT OFFICE

FRANCIS WHEATLEY, OF KANSAS CITY, MISSOURI.

HOSE-NOZZLE.

992,314.  Specification of Letters Patent.  Patented May 16, 1911.

Application filed February 7, 1910. Serial No. 542,556.

*To all whom it may concern:*

Be it known that I, FRANCIS WHEATLEY, a citizen of the United States, residing at Kansas City, in the county of Jackson and State of Missouri, have invented certain new and useful Improvements in Hose-Nozzles, of which the following is a specification.

My invention relates to improvements in hose-nozzles, and my object is to increase the efficiency of devices of this character by diminishing the friction between the interiors thereof and the fluids being discharged therefrom, to the end that fluids having the same initial velocity may be discharged with greater force than heretofore.

The invention embraces a lubricant chamber and an automatic piston, which latter compresses the former and forces the oil therefrom, so that the interior of said piston will become coated with a thin film of oil and offer but little resistance to the escaping stream of fluid.

The invention also embraces means for dividing the stream into a spray.
Other features of the invention will hereinafter be pointed out, and in order that said invention may be fully understood, reference will now be made to the accompanying drawing, in which:
Figure 1 represents a side elevation of my improved nozzle. Fig. 2 is a central longitudinal section of the same on line II—II of Fig. 1. Fig. 3 is a cross section on line III—III of Fig. 2. Fig. 4 is a cross section on line IV—IV of Fig. 2. Fig. 5 is an enlarged broken section on line V of Fig. 2. Fig. 6 is a broken side elevation of a spraying attachment.

In constructing my improved nozzle I employ a main tubular section 1, and a tubular piston section 2, which latter is slidably and rotatably mounted in the former, and of sufficiently less diameter to leave an annular lubricant chamber 3. The forward end of the lubricant chamber is closed by a cap-nut 4, which screws upon the end of section 1, an internal nut 5, and a gasket 6, which is interposed between the nuts and embraces the piston, to prevent leakage of oil around the same.

The rear end of the lubricant chamber is closed by jam-nuts 7, one of which engages the rear threaded end of the piston section 2, an intermediate nut 8, and gaskets 9 interposed between nuts 7 and the intermediate nut 8, and embracing the rear end of the piston section to prevent leakage of oil around the same. The lubricant chamber is filled with oil through a feed-opening 10 to which access is gained by removing nut 4. The oil escapes from the lubricant chamber to the interior of the piston section 2 through a series of perforations 11, in the rear portion of said piston section. Perforations 11 are controlled by a valve 12 rotatably engaging the rear portion of the piston section and having a series of perforations 13 adapted to register with perforations 11, which latter, however, may be partly or completely closed by turning the valve 12. After the valve has been properly adjusted it is secured from accidental movement by a set-screw 14.

The rear portion of the main tubular section is provided with the usual coupling 15, so that it may be readily connected to a hose.

16 designates a sleeve abutting against the rear jam-nut 7 where it is held by the annular shoulder 17 of an internally and externally threaded annulus 18 engaging both the rearmost nut 7 and the rear externally threaded end of the piston section 2. Annulus 18 is provided at its rear portion with a plurality of deflecting wings 19 pivotally secured thereto by screws 20, and having their pivoted portions arranged in recesses 21 in the annulus. Recesses 21 terminate at one side in straight shoulders 22, and at their opposite side in beveled shoulders 23, which shoulders act as stops in limiting the pivotal movement of the wings. When the latter abut against the straight shoulders 22 they will offer little or no resistance to the stream of fluid passing through the nozzle, but when drawn into position against the beveled shoulders 23, see Fig. 6, divide the stream and cause it to discharge in the form of spray, which will spread out over a large surface. The opposite sides of each wing 19 are loosely engaged by a pair of pins or screws 24 extending inwardly through the sleeve, which latter is provided at its rear end with a threaded bushing 25, carrying a nut 26, and a cup-shaped gasket 27, against which the stream impinges and thus holds the sleeve from rotatable movement. Sleeve 16 is provided with peripheral perforations 28 so that a portion of the fluid may flow between said sleeve and the tubular section

1 and against the rearmost gaskets 9 and the gasket 27.

When the nozzle is connected to a hose and the water turned on, a portion of it will impinge against the rear side of gasket 27 and bushing 25, and force the piston section forward to compress the lubricant chamber and force oil therefrom through the perforations 11. As the oil slowly escapes through said perforations it will be taken up by the water and distributed throughout the length of the piston section, thereby lubricating the same so that it will offer but little resistance to the escaping stream. The stream will also become enveloped in a thin film of oil hence as it escapes from the nozzle, the film will prevent it from disintegrating into spray, and consequently, it will be thrown in a compact stream for a considerable distance.

When desired oil may be omitted from chamber 3, and chemicals substituted therefor, having the property of extinguishing fire when dissolved and thoroughly commingled with the stream discharging from the nozzle.

When it is desired to convert the stream into a spray, the piston section 2 is grasped by its knob 2ª and turned around until the beveled shoulders 23 on the annulus, which turns with the piston section, engages and draws the wings to the dotted position shown in Figs. 3 and 6, the outer ends of said wings being held from turning with the annulus by the screws 24. Likewise, when the knob of the piston is turned in a reverse direction to restore the wings to normal position, said screws 24 will hold the rear ends of the wings until the straight shoulders 22 abut against the same.

Having thus described my invention, what I claim is:—

1. A hose-nozzle consisting of an outer tubular section and a tubular piston section, which latter is slidably mounted in the former and of sufficiently less diameter to form a chamber having communication with the interior of said piston.

2. A hose-nozzle consisting of an outer tubular section and a tubular piston section, which latter is slidably mounted in the former and of sufficiently less diameter to leave a chamber, said piston having perforations communicating with the chamber, and a sleeve adjustably mounted on the piston and provided with perforations adapted to register with those in the piston.

3. A hose-nozzle consisting of an outer tubular section and a tubular piston section, which latter is slidably mounted in the former and of sufficiently less diameter to form a chamber having communication with the interior of said piston, and a hose-coupling carried by the outer tubular section.

4. A hose-nozzle consisting of an outer tubular section and a tubular piston section, which latter is slidably mounted in the former and of less diameter to leave a chamber, means carried by said sections for closing the ends of said chamber, means in the outer section through which the chamber may be replenished with oil, and means controlling communication between the piston section and the chamber.

In testimony whereof I affix my signature, in the presence of two witnesses.

FRANCIS WHEATLEY.

Witnesses:
F. G. FISCHER,
M. COX.